(12) United States Patent
Chang

(10) Patent No.: US 6,850,344 B2
(45) Date of Patent: Feb. 1, 2005

(54) TRANSPARENT SCANNING APPARATUS

(75) Inventor: Chun-Ying Chang, Taipei (TW)

(73) Assignee: Mustek Systems Inc., Hsinchu (TW)

(*) Notice: Subject to any disclaimer, the term of this patent is extended or adjusted under 35 U.S.C. 154(b) by 665 days.

(21) Appl. No.: 09/851,972

(22) Filed: May 10, 2001

(65) Prior Publication Data
US 2002/0039205 A1 Apr. 4, 2002

(30) Foreign Application Priority Data
Oct. 2, 2000 (TW) .................................... 89217083 U

(51) Int. Cl.$^7$ ................................................ H04N 1/04
(52) U.S. Cl. ........................ 358/487; 358/474; 358/497; 358/496
(58) Field of Search ................................ 358/487, 474, 358/506, 497, 449, 453, 475, 462; 355/75, 67; 362/26, 27

(56) References Cited

U.S. PATENT DOCUMENTS

| | | | | |
|---|---|---|---|---|
| 5,781,311 A | * | 7/1998 | Inoue et al. | 358/475 |
| 6,185,011 B1 | * | 2/2001 | William | 358/474 |
| 6,494,586 B1 | * | 12/2002 | Huang et al. | 362/27 |
| 6,519,023 B1 | * | 2/2003 | Chang | 355/18 |
| 6,621,599 B1 | * | 9/2003 | Newell | 358/474 |

* cited by examiner

Primary Examiner—Edward Coles
Assistant Examiner—Heather D Gibbs
(74) Attorney, Agent, or Firm—Birch, Stewart, Kolasch & Birch, LLP

(57) ABSTRACT

A transparent scanning apparatus is mounted on a cover of a flatbed scanner for scanning a transparent document by reflective scanning or transparent scanning. The apparatus comprises a transparency adapter secured to the cover, a plurality of frames for fixing article, an opaque box for receiving the frames, and a fastening means for releasable securing the transparency adapter to the box and entirely covering the window of the transparency adapter when the box is secured to the transparency adapter.

8 Claims, 7 Drawing Sheets

TRANSPARENT SCANNING APPARATUS

BACKGROUND OF THE INVENTION

1. Field of Invention

The present invention relates to a transparent scanning apparatus of flatbed scanners to scan transparent articles such as transparent documents, films, or the like.

2. Related Art

It is well known to employ a scanner to scan a reflective article or transparent document. The difference between reflective scanning and transparent scanning is the configuration of scanning light source. If light source and a charged coupled device (CCD) are at the same side when an article to be scanned, it is defined as reflective scanning. To the contrary, if light source and CCD are at the opposite sides with respect to the article to be scanned, it is defined as transparent scanning.

It is very important to stably place an article to be scanned on a position of scanner for preventing it from moving during scanning irrespective as to whether it is done by reflective scanning or transparent scanning. It is also known that a conventional back-lighted transparency adapter is classified as independent transparency adapter and built-in transparency adapter in cover. However, both previous designs suffered from several disadvantages. For example, it is not easy to store a frame for positioning a transparent article and access the same later. Further, as a flatbed scanner, it is impossible for a transparency adapter to provide a single color of background. As such, it is usually taken a long time for a software to select a scanning area automatically by comparing the difference between the color of the background and the article. Furthermore, the surface of transparency adapter is easy to be damaged, such as scratched or collision, because it is exposed to cover. Moreover, an enclosure for a transparent article is required. This inevitably increases the volume of article.

A number of published Taiwanese patents with respect to a fixing device for a transparent document of a scanner are described below. For example, a Taiwanese Patent Published No. 294,428 entitled "Clamping device for Transparent Document of Scanner" disclosed an upper cover and a lower cover. Upper cover has an opening for defining an area. An elongate slot is adjacent the front side of the area. An elastic member is provided in the slot. Lower cover is coupled to upper cover. Lower cover has a recess for receiving a carrier. A gap is formed between the carrier and the elastic member for receiving and fastening a transparent document. However, this design is complex in components. Also, it is not easy for precisely positioning the carrier in such a narrow space. As a result, the carrier tends to slant, thus causing trouble to user. Another embodiment is disclosed in above patent in which a base is provided. The base comprises a clamp member fitted on a recess of the base. A plurality of rectangular cavities are formed on the clamp member for receiving an article to be scanned. A cover is releasably secured to the clamp member. A plurality of arc-shaped elastic pieces are formed on either side of the base. Such arc-shaped elastic pieces are in sliding contact with side rails in the scanner. The clamp member further comprises a plurality of openings each for defining a region. An inward disposed stop is formed on the side of the region. An elastic bracket is formed on the opposite side of the region. The elastic bracket has a recessed portion for receiving an article to be scanned. The article is fastened by the elastic bracket and the stop. However, this embodiment is still complex. Further, it is required to pull the clamp member from the recess of the base prior to opening the cover for changing the article while in use. This may cause inconvenience.

As to other known techniques for fastening a transparent document, a variety of frames for fixing the article are placed in a flaky cavity of transparency adapter. A rectangular frame received in the cavity by passing through the opening of the cavity is slightly smaller than the cavity in width. An opening is also provided on the rectangular frame for receiving a transparent document, a positive frame, or a negative frame. Positive frame has at least one flaky slot and a groove on the periphery of each slot for facilitating receiving and accessing the transparent document. Also, negative frame has the same configuration of flaky slots and grooves as the positive frame for facilitating operation. However, such design is disadvantageous for being difficult to place a rectangular frame in the cavity horizontally. As such, rectangular frame, positive frame, or negative frame may be slanted. Further, there is no suitable way for receiving rectangular frame, positive frame, or negative frame after scanned.

Another Taiwanese Patent Published No. 334,151 entitled "Method for Scanning Transparent Document And Frame for Fixing the Same" disclosed some components related to the present invention. For example, an opaque frame is provided. A plurality of cavities are formed on the frame. An arcuate recess is formed on the side of each cavity for ease of accessing and placing the article by hand. A transparent window in provided in each cavity for permitting light to pass through while scanning the article placed thereon. However, such design is disadvantageous for the reasons that the surface of transparency adapter is susceptible of damage (e.g., scratched or collision) due to its unflatness, and it is impossible of providing a single color of background thus causing excessive scanning time.

Still another Taiwanese Patent Published No. 361,032 entitled "Scanner Having Upper and Lower Light Sources and Moveable Blind for Upper Light Source" disclosed a scanner having an upper, a lower light sources, and a blind for blocking light emitted from the upper light source. However, such blind is provided for achieving the purpose of blocking the upper light source only. Thus it is limited in application.

SUMMARY OF THE INVENTION

It is therefore an object of the present invention to provide a transparent scanning apparatus mounted on a cover of a flatbed scanner for scanning a reflective article or a transparent document by reflective scanning or transparent scanning.

The apparatus comprises a transparency adapter secured to the cover, the transparency adapter including a window and a light emitting means for emitting light to the article through the window of the transparency adapter; a frame for fixing articles having a carrying surface for supporting the articles and a pierced window on the carrying surface for permitting scanning light emitted from the light emitting means to pass through the window of the frame and the article; an opaque box for receiving the frames for fixing articles; and a fastening means for releasable securing the transparency adapter to the box and entirely covering the window of the transparency adapter when the box is secured to the transparency adapter. An optical recognition mark is formed the box served as a positioning means for the flatbed scanner to perform an auto crop during the reflective scanning. This can effect a quick image fetching.

The box provides the containing space for the frames of all kinds for fixing the transparent documents when the apparatus is not in use.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become fully understood from the detailed description given hereinafter illustration only, and thus are not limitative of the present invention, and wherein.

DETAILED DESCRIPTION OF THE INVENTION

Figure 1:
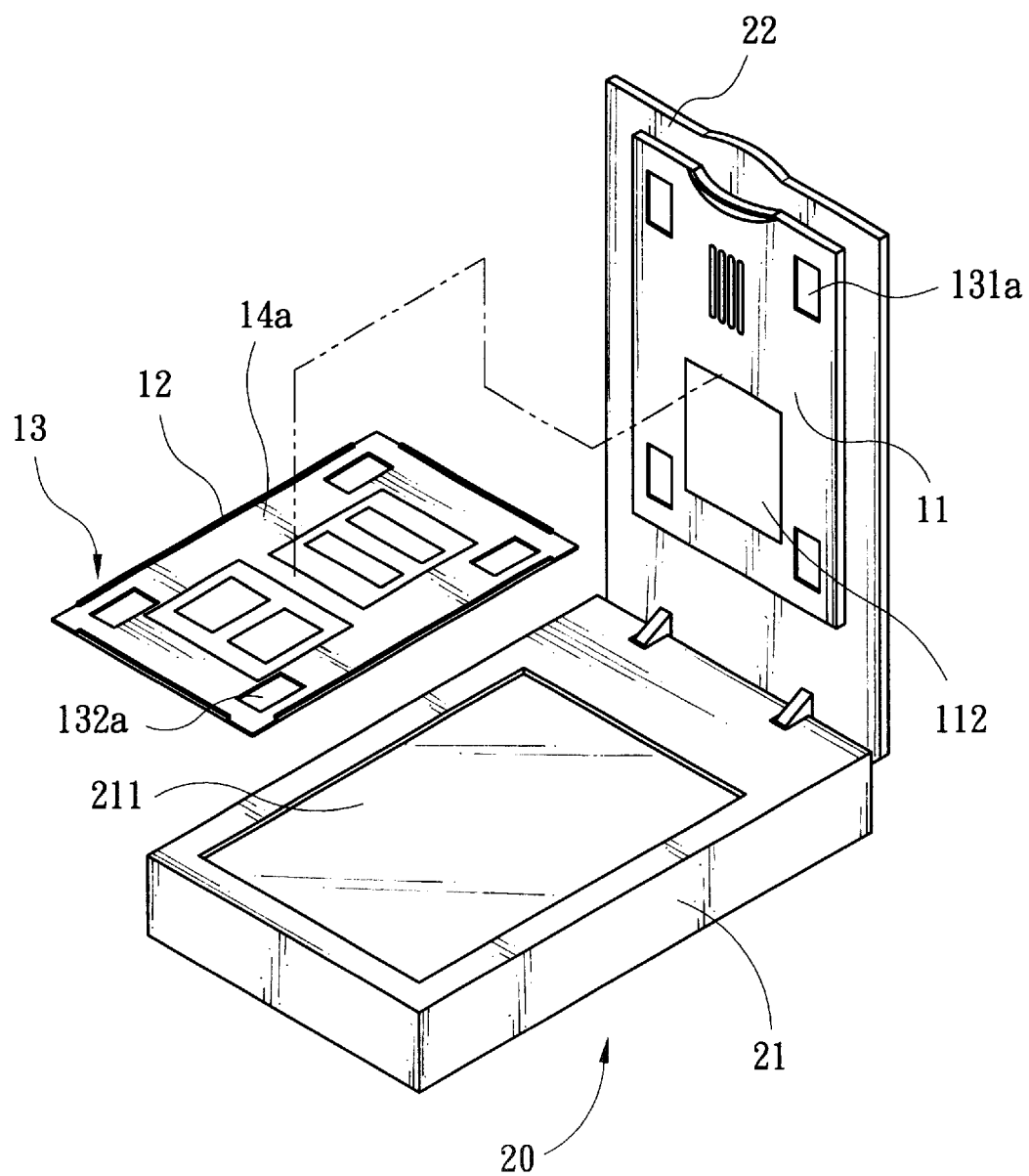
FIG. 1 is an exploded perspective view of a preferred embodiment of transparent scanning apparatus according to the invention of a scanner.
Figure 2:
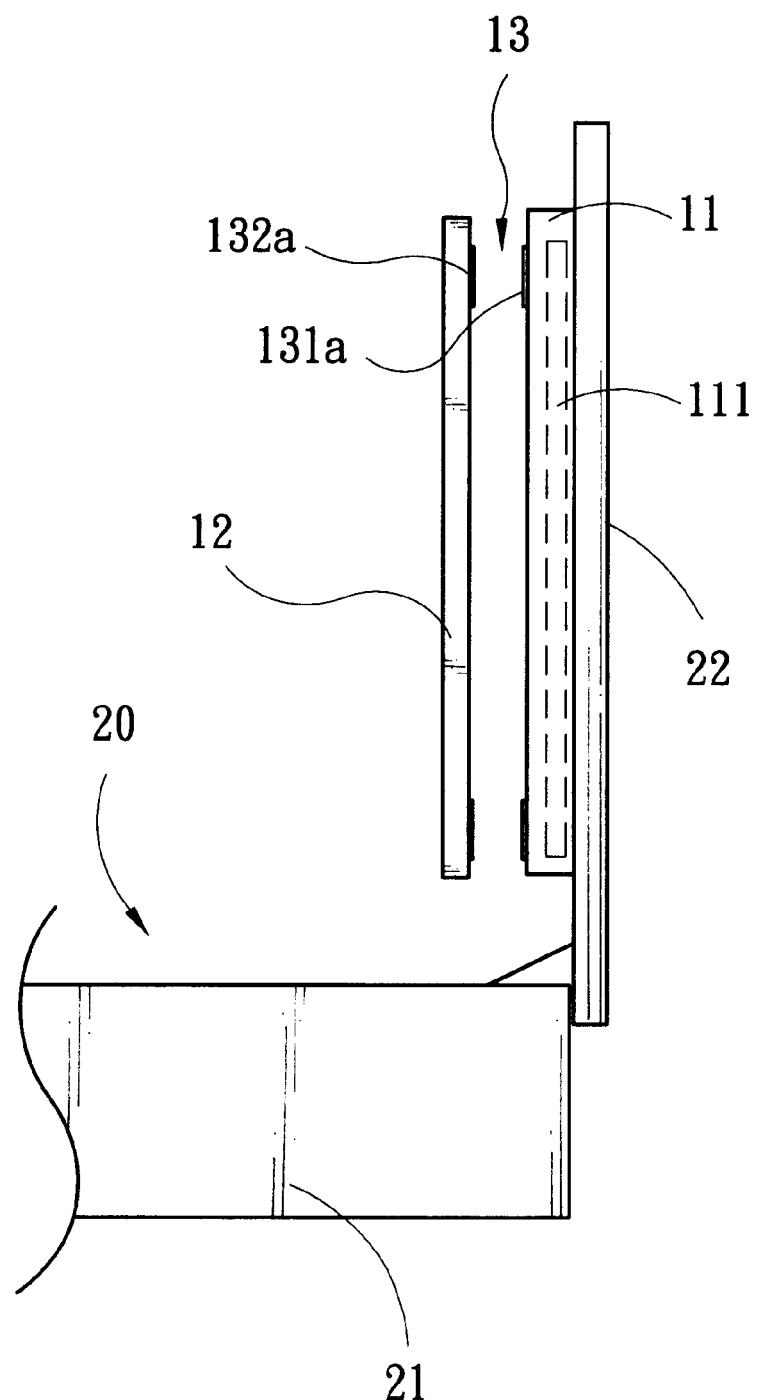
FIG. 2 is a partial side view of FIG. 1.
Figure 3:
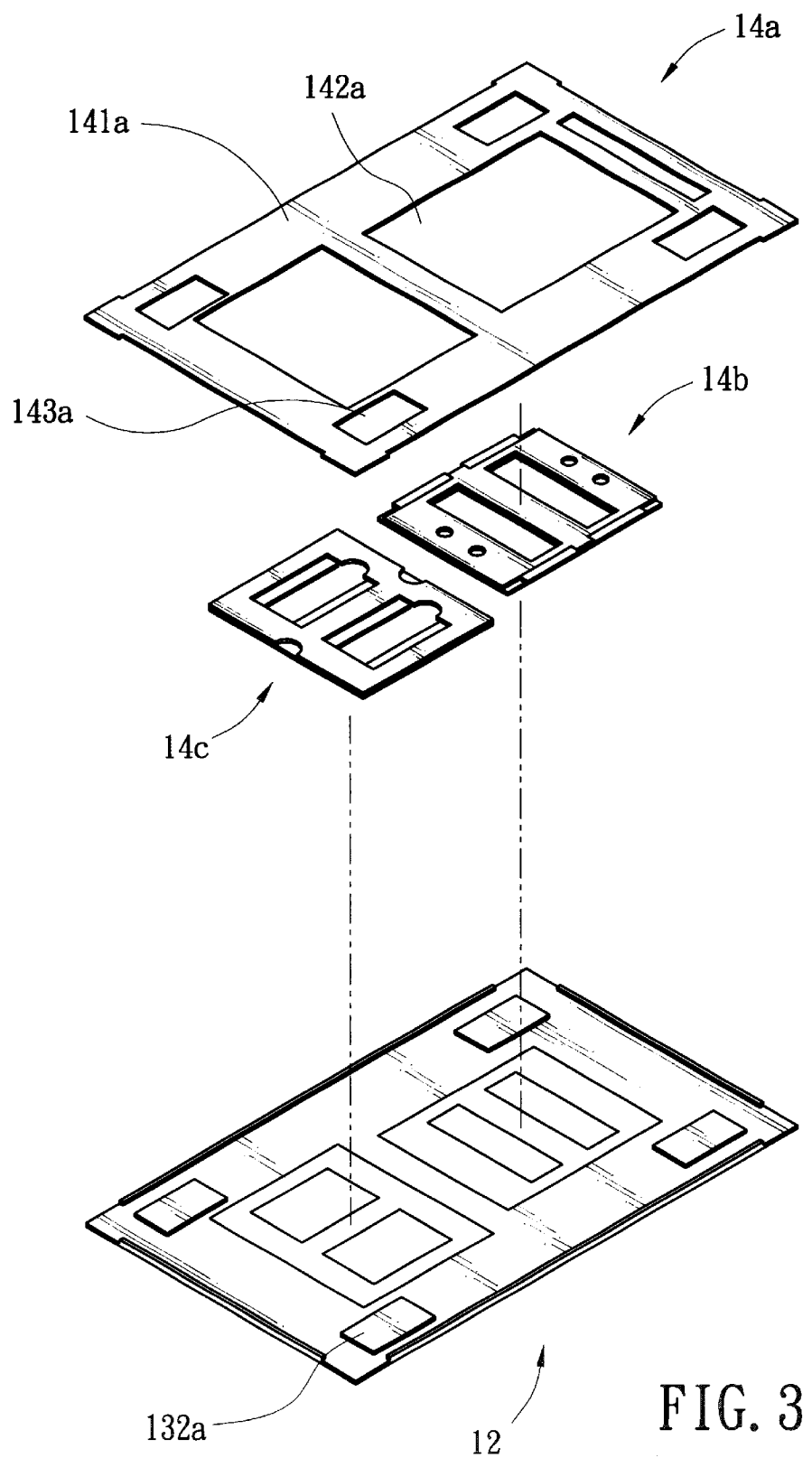
FIG. 3 is an exploded view of box and frame for fixing article shown in FIG. 1.

Referring to FIGS. 1 to 3, there is shown a transparent scanning apparatus constructed in accordance with the invention mounted on a flatbed scanner 20. Scanner 20 comprises a housing 21 and a cover 22 hinged flexibly to a side of housing 21. Housing 21 comprises a transparent flatbed (e.g., glass flatbed) 211 for supporting an article to be scanned and an internal scan module (not shown) for scanning the article and converting the scanned image of article into a digital form. The apparatus comprises a transparency adapter 11, a box 12, a fastening means 13, and a plurality of frames 14a, 14b, and 14c for fixing article. Transparency adapter 11 is secured to cover 22 and comprises a window 112 and a light emitting element 111 for emitting light to the article to be scanned through window 112. Box 12 has a rectangular flat shape. Also, box 12 is an opaque member being releasable secured to transparency adapter 11 by fastening means 13. Window 112 is entirely covered when box 12 is secured to transparency adapter 11.

Figure 8:
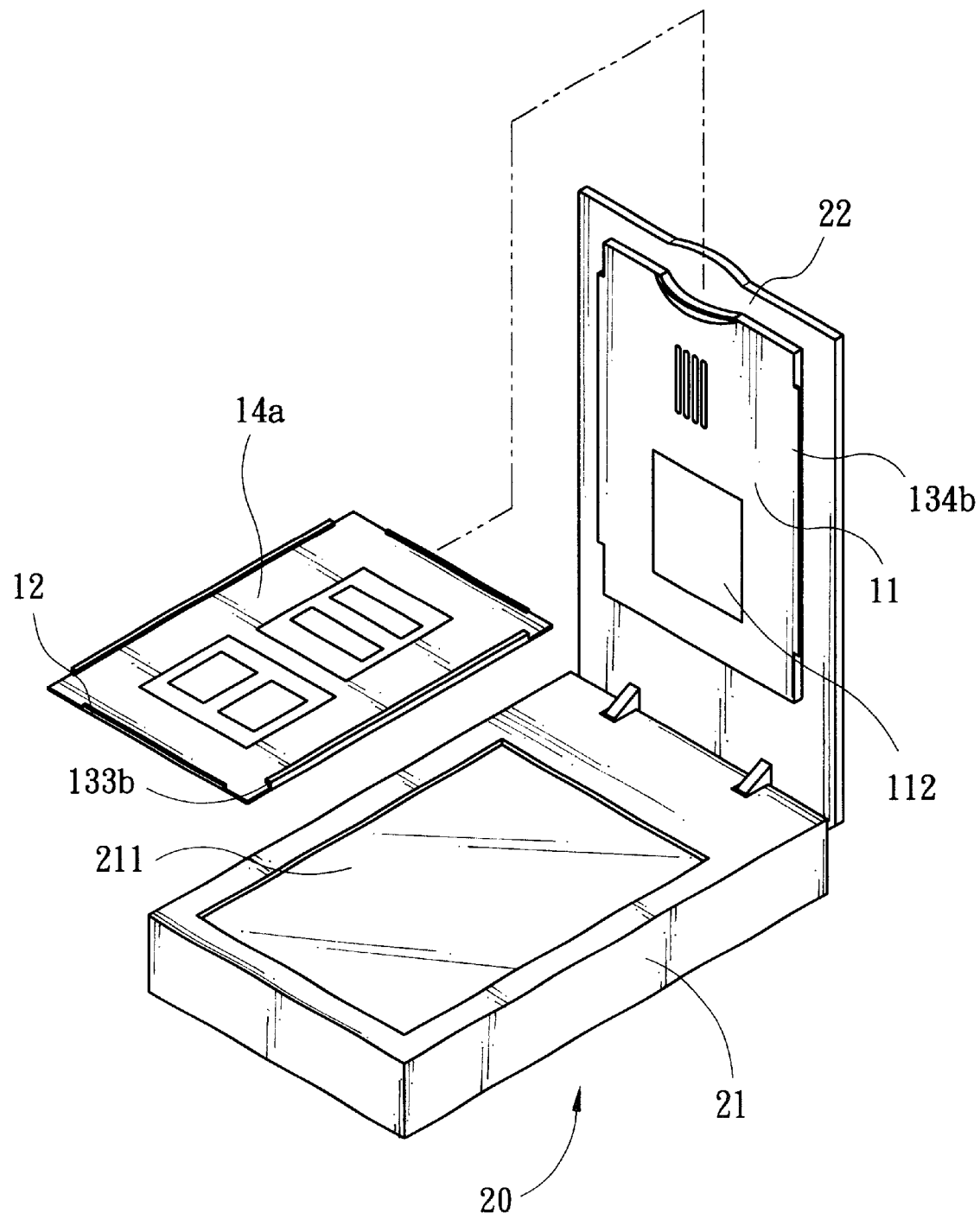
FIG. 8 is an exploded perspective view of a second embodiment of fastening means of the FIG. 1 apparatus.
Figure 9:
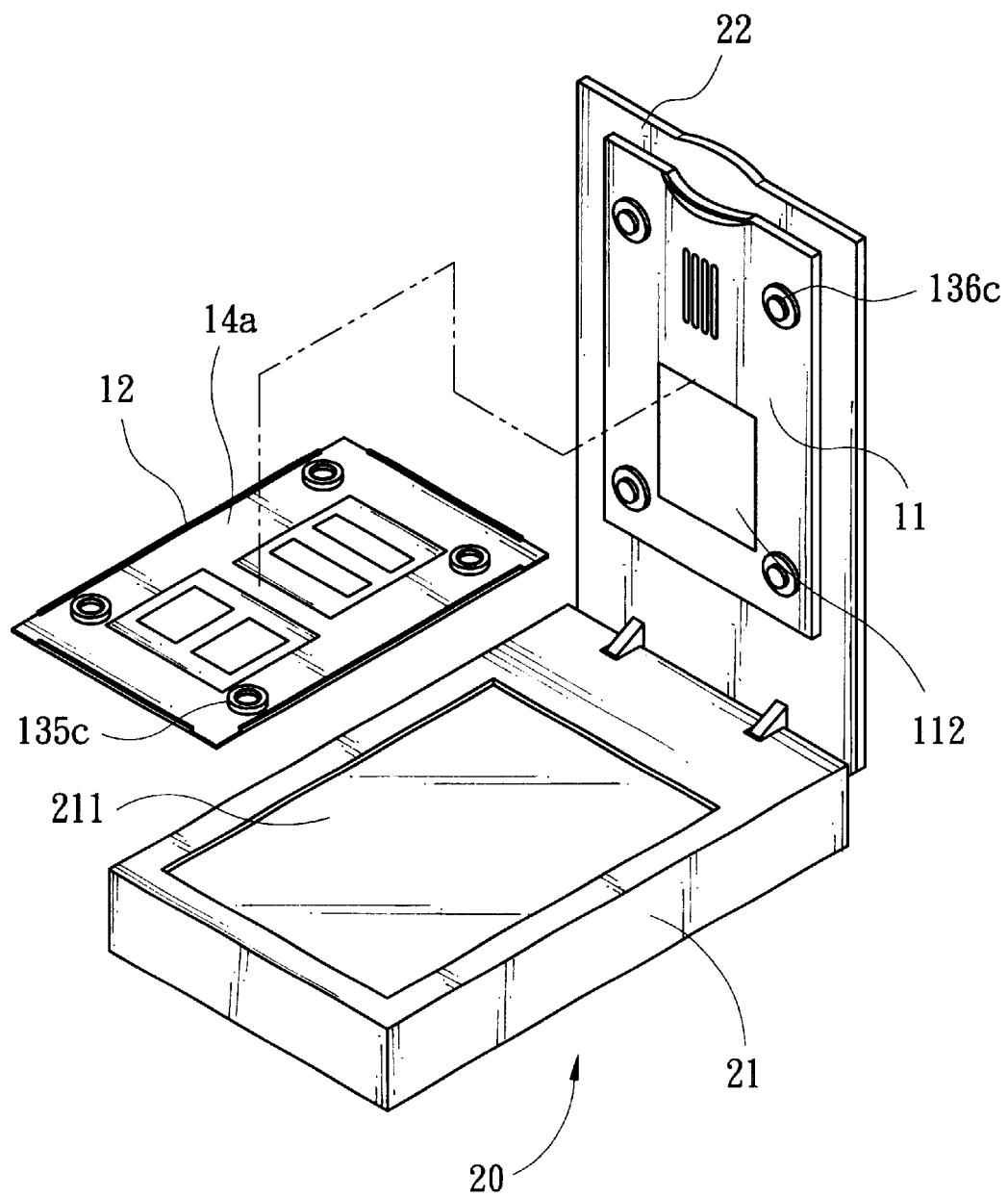
FIG. 9 is an exploded perspective view of a third embodiment of fastening means of the FIG. 1 apparatus.

Referring to FIGS. 1, 8, and 9, a variety of fastening means 13 will now be described. As shown in FIG. 1, fastening means 13 is implemented as a plurality of Velcro type fasteners 131a and a plurality of mating Velcro type fasteners 132a on transparency adapter 11 and box 12 respectively. Further, as shown in FIG. 8, fastening means 13 is implemented as a pair of sliding members 134b and a pair of corresponding grooved rails 133b on transparency adapter 11 and box 12 respectively. Furthermore, as shown in FIG. 9, fastening means 13 is implemented as a plurality of buttonholes 135c and a plurality of buttons 136c on box 12 and transparency adapter 11 respectively.

Figure 4:
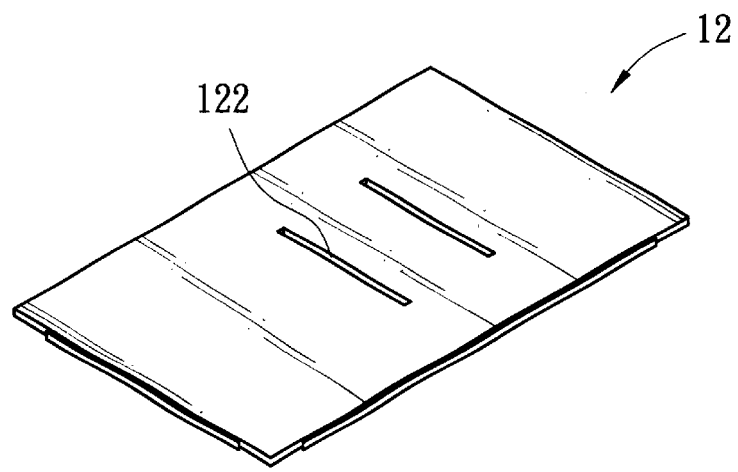
FIG. 4 is another perspective view of the FIG. 3 box.
Figure 5:
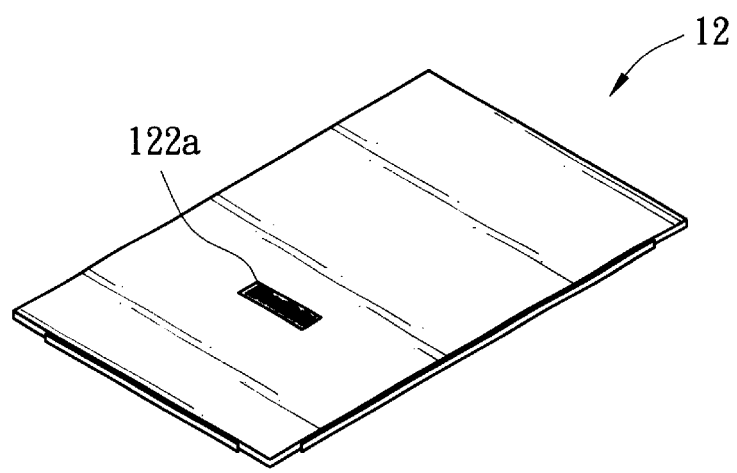
FIG. 5 is a perspective view of a second embodiment of box.
Figure 6:
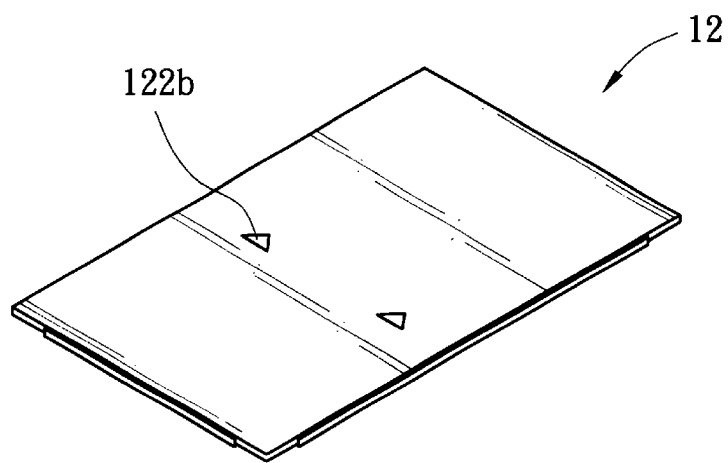
FIG. 6 is a perspective view of a third embodiment of box.

Referring to FIGS. 4 to 7, a plurality of embodiments of box 12 will now be described. In FIG. 4, at least one optical recognition mark 122 is provided on box 12 served as a positioning means for flatbed scanner 20 to perform an auto crop during reflective scanning. As such, a running software may quickly position an article to be scanned by recognizing the mark 122 for effecting a quick image fetching. This means that scanning apparatus may search the article to be scanned from mark 122 rather than from the boundary of window, thus greatly shortening the scan time. As shown in FIG. 4, mark 122 is implemented as an elongate slit. Further, as shown in FIG. 5, mark 122 is implemented as a bar code 122a. Furthermore, mark 122 is implemented as a geometric figure, such as a pair of triangles 122b that is shown in FIG. 6.

Figure 7:
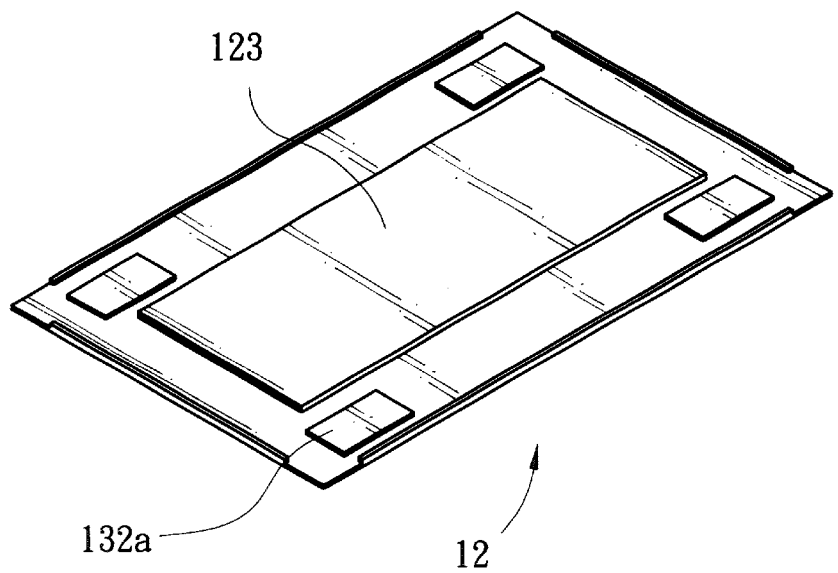
FIG. 7 is a perspective view of a fourth embodiment of box.

As shown in FIG. 7, a pouch 123 is provided on box 12 (detailed later).

The plurality of frames 14a, 14b, and 14c for fixing article are designed to cooperate with a variety of articles such as special-sized films (like size A5), negatives, positives, or the like (see FIG. 3). Of course, only a frame 14a is needed to support various sized transparency documents when a plurality of dents on the surface or the edge are formed (not shown in figures). A carrying surface 141a is formed on frame 14a to support a transparent document and position it. Note that each of frames 14a and 14b has the same structure as frame 14a, thus omitting a description thereof for the sake of brevity. A pair of pierced windows 142a are formed on carrying surface 141a for permitting scanning light to pass through the windows 142a and the article to be scanned. Also the structure of frames 14b and 14c is the same as frame 14a. A plurality of (e.g., four) openings 143a are formed on the corners of frame 14a for fixing article for permitting fastening means (e.g., Velcro type fasteners) 13 to pass through. When frames 14a, 14b, and 14c for fixing articles are not used, it is possible to place them into box 12. Then secure frames 14a, 14b, and 14c for fixing articles and box 12 to cover 22. This is a preferred form of storing frames 14a, 14b, and 14c for fixing article. Also, it is possible to store frames 14a, 14b, and 14c for fixing articles in the pouch 123.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A transparent scanning apparatus mounted on a cover of a flatbed scanner for scanning a transparent document or a reflective article, the apparatus comprising:

a transparency adapter secured to the cover including light emitting means and a window for light of the light emitting means to pass through the article;

a frame having a carrying surface for supporting the article and a pierced window for permitting scanning light emitted from the light emitting means to pass through the window of the frame and the article;

an opaque box for receiving the frame, the box comprises an optical recognition mark serving as a positioning means for the flatbed scanner to perform an auto crop during the reflective scanning, and a pouch for storing the frame; and fastening means for releasably securing the box to the transparency adapter and joining the window of the transparency adapter.

2. The apparatus of claim 1, wherein the optical recognition mark is a slit.

3. The apparatus of claim 1, wherein the optical recognition mark is a bar code.

4. The apparatus of claim 1, wherein the optical recognition mark is a geometrical figure.

5. The apparatus of claim 1, wherein the box has a rectangular flat shape.

6. The apparatus of claim 1, wherein the fastening means comprises a plurality of hook and loop fasteners and a plurality of mating hook and loop fasteners on the transparency adapter and the box, respectively.

7. The apparatus of claim 1, wherein the fastening means comprises a pair of sliding members and a pair of corresponding grooved rails on the transparency adapter and the box respectively.

8. The apparatus of claim 1, wherein the fastening means comprises a plurality of buttonholes and a plurality of buttons on the box and the transparency adapter respectively.

* * * * *